United States Patent [19]
Danowski et al.

[11] Patent Number: 5,720,308
[45] Date of Patent: Feb. 24, 1998

[54] PARTS WASHER WITH SOLVENT FLOW CONTROL

[75] Inventors: Thomas J. Danowski, Elgin; Michael R. Dvorak, Lemont, both of Ill.

[73] Assignee: Safety Kleen Corp., Elgin, Ill.

[21] Appl. No.: 593,034

[22] Filed: Feb. 23, 1996

Related U.S. Application Data

[63] Continuation-in-part of Ser. No. 399,909, Mar. 7, 1995, Pat. No. 5,598,861.

[51] Int. Cl.$^6$ .................................................. B08B 3/02
[52] U.S. Cl. ........................ 134/111; 134/172; 134/182; 134/186
[58] Field of Search ........................ 134/110, 111, 134/201, 200, 186, 182, 183, 172

[56] References Cited

U.S. PATENT DOCUMENTS

| | | |
|---|---|---|
| 140,719 | 7/1873 | Meunier . |
| 441,121 | 11/1890 | Bartliff . |
| 653,012 | 7/1900 | Koyl . |
| 958,832 | 5/1910 | Russell . |
| 1,065,992 | 7/1913 | Wheelock . |
| 2,675,012 | 4/1954 | Scales . |
| 3,373,875 | 3/1968 | Krikorian . |
| 3,522,814 | 8/1970 | Olson . |
| 3,707,404 | 12/1972 | Carlson et al. . |
| 3,893,659 | 7/1975 | Krish . |
| 3,921,653 | 11/1975 | Ducharme . |
| 4,105,342 | 8/1978 | Plourde . |
| 4,464,256 | 8/1984 | Plourde . |
| 4,505,284 | 3/1985 | Kyatt . |
| 4,696,073 | 9/1987 | Urbania . |

FOREIGN PATENT DOCUMENTS

| | | |
|---|---|---|
| 1621604 | 9/1970 | Germany . |
| 2203813 | 10/1986 | United Kingdom . |

*Primary Examiner*—Frankie L. Stinson
*Attorney, Agent, or Firm*—James T. Fitzgibbon

[57] ABSTRACT

A drain flow control assembly for liquids draining from a sink or the like to a reservoir having a given liquid level. The flow control assembly includes a downtube with its inlet opening above the level of the liquid and its outlet below the liquid level, a divider plate surrounding the outlet opening and extending radially outwardly of the opening a distance equal to at least twice the diameter of the downtube opening. The assembly also includes a radially smaller, imperforate deflector plate positioned beneath and spaced closely apart from the divider plate, so as to form a radially extending transfer space between the two plates. When the assembly is positioned in a liquid-containing reservoir with the downtube outlet below the upper surface of the liquid, liquid flows vertically through the downtube outlet opening and then horizontally through the radial transfer space. The flow through the transfer space serves to separate entrained particulate matter disposed in the liquid, and the divider plate serves to separate the reservoir into a lower, particulate matter settling region and an upper region of quiescent, clarified liquid.

8 Claims, 5 Drawing Sheets

PARTS WASHER WITH SOLVENT FLOW CONTROL

BACKGROUND OF THE INVENTION

This application is a continuation-in-part of application Ser. No. 08/399,909, filed Mar. 7, 1995 now U.S. Pat. No. 5,598,861. The present invention relates generally to an apparatus for controlling the flow of liquids, and in one instance, controlling solvent flow in a parts washer apparatus of the type having a solvent reservoir, a receptacle such as a sink or the like associated with the reservoir for positioning parts to be washed by solvent contained in the reservoir, and a pump and motor for recirculating solvent from the reservoir to the sink.

A typical parts washer with which the invention is useful is a parts washer of the type described in U.S. Pat. No. 3,522,814. This patent discloses a parts washer wherein a sink is positioned atop a barrel-type reservoir and in which a submersible pump in the reservoir circulates solvent from the reservoir to the interior of a sink in which parts are disposed for washing. While the washing is being carried out, solvent continually drains from an opening in the bottom of the sink back into the reservoir sometimes passing through a filter or screen on its way to the reservoir.

Over the years, the most successful parts washers have been those that can be readily and economically serviced. Servicing has consisted of changing the solvent, the filter, if any, and a general machine clean-up. In use, solvent used in a parts washer becomes increasingly dirty until its ability to clean is compromised by the presence of dispersed contaminants and/or soluble oils and greases.

While soluble materials cannot be separated easily except by distillation and hence cannot be removed in situ, particulate matter can be separated, at least to a degree. Some of the particulate matter is of a size such that it readily settles out by gravity; some is entrapped by filtration. Other contaminants of smaller particle size remain suspended indefinitely and circulate with the solvent, compromising its cleaning efficiency, and in some cases, accelerating wear on the pump and/or the pump seals.

For reasons known to those in the industry, it is not practical to subject solvent to very fine mesh filtration, especially considering the construction and operation of most or all mechanical parts washers. The pressure drop across an effective filter of conventional construction is high and good filtration of fine particles cannot be achieved at the required solvent flow rates, because insufficient pressure is available from lightweight, economical submersible pumps.

Regarding the contaminants in the solvent which remain in the reservoir during parts washing, such contaminants tend to be recirculated by the pump because they remain in suspension; in fact, the turbulence created by recirculation tends to re-suspend particles that might separate out under quiescent conditions. In prior art parts washers, the solvent that had just washed the parts in the sink was dumped or splashed into the body of liquid in the reservoir, contributing to turbulence within the body of solvent.

Efforts to permit a solvent to settle at the bottom of the reservoir and to withdraw solvent from the upper portion of the reservoir have not always been successful. The height of the recirculating pump pickup is usually fixed. The level of the upper surface of the solvent tends to vary considerably in depth or height as a result of evaporation, dilution, spillage, and other factors beyond the control of the user. Hence, to be safe, the pump location is usually fixed nearer the bottom of the reservoir.

The problem of separating particulates has been approached by a proposal that a water layer be placed beneath the solvent, allowing solvent to float on top of the water. With such an arrangement, spent solvent is discharged beneath the level of the water layer and allowed to float back to the solvent layer. This is intended to secure cleansing of the solvent by water washing. However, this approach has not been entirely successful, either. Providing a two-phase system involves a certain inevitable amount of emulsifying one liquid within the other. Moreover, any water-based composition tends to create problems of rust, both for the parts which are unintentionally bathed with a minor amount of water and with the containers, to which aqueous systems are more destructive than solvent.

Recently, a successful approach to the problem has been suggested, which approach comprises chemically treating the solvent in such a way as to enhance sedimentation of particulate matter and accelerate its deposition on the bottom of the mass of material. However, there is a delicate balance at work in such systems and mechanical agitation can often compromise the effectiveness of a separation method.

The present invention involves the discovery that cleaning action consistent with long life can be achieved by mechanically separating the reservoir into contaminant-rich and relatively clean portions, and controlling the return of circulated solvent to the reservoir through a drain mechanism constructed and arranged so as to enhance settlement of particulates and to provide two separate, preferably quiescent regions—one where the solid contaminants can remain undisturbed, thus allowing effective settling, and a relatively clean second region adjacent the pump that picks up the solvent for recirculation.

According to this concept, the system includes a drain tube that communicates with the sink opening at one end and terminates at the other end in an opening in a divider plate. The divider plate may but need not have its outer edges spaced just apart from the outer sidewall of the reservoir. A deflector plate is placed beneath the drain opening in the divider plate and spaced vertically therefrom a short distance, whereby solvent passing vertically through the lower drain tube opening is directed radially outwardly. This radial flow action enhances the settling tendencies of any particulate material in the returning solvent by the reduction in velocity of the flow and resultant reduction in particle entrainment and retention. The particulates remain on the reservoir bottom as a sediment layer, isolated from the flowing solvent by the deflector plate. The overall level of solvent is maintained as the clarified solvent slowly rises from the first quiescent region above the sediment layer and passes by or around the divider plate and into the second zone in which the pump is positioned.

In view of the inability of the prior art to provide an effective isolating action for separating a contaminant-rich liquid such as cleaning solvent from contaminant-free solvent, it is an object of the present invention to provide an improved mechanical parts washer having such a separating action.

Another object of the invention is to provide an improved parts washer that is simple to construct and reliable in operation.

Yet another object of the invention is to provide an improved parts washer which includes a combination divider plate and flow deflector assembly adapted to create particular flow patterns tending to minimize turbulence within the body of the solvent in the reservoir.

A further object of the invention is to provide a parts washer wherein the sink drain communicates with a tube terminating at its lower end in a divider plate with a center aperture therein, and wherein a deflector creates and maintains a horizontal flow of fluid passing through the aperture, thus allowing particles to settle into the bottom of the body of solvent in the reservoir.

A still further object of the invention is to provide a drain flow arrangement for a parts washer wherein the divider plate may be adjustably positioned relative to the remaining elements of the apparatus to facilitate effective division of the mass of solvent in the reservoir into separate, quiescent spaces.

An additional object of the invention is to provide a parts washer apparatus having an improved separation mechanism and one which may also be readily serviced and economically manufactured, in order to provide or enhance a favorable contaminant settling action.

A further object of the invention is to provide a parts washer that works effectively with ordinary solvent and also with solvent that may be capable of enhanced particle separation and settling action, and which also operates well with aqueous liquids.

Another object of the invention is to provide an apparatus which will lengthen the service interval required of parts washers by extending the effective cleaning life of the solvent.

Yet another object of the invention is to provide an apparatus which will ensure that solvent from which contaminants have settled remains clarified and free of contaminants during circulation of the remainder of the solvent over the parts being cleaned.

A further object of the invention is to provide a drain flow control assembly which includes a divider plate, a deflector plate, collector and a downtube, and which assembly includes a leg arrangement permitting the apparatus to be supported within a drum or other receptacle independently of the sink forming a part of an associated parts washer.

A still further object of the invention is to provide a flow control device including a liquid collector, a downtube, and a separator mechanism, and which also includes plural adjustable legs that may be readily positioned to achieve maximum support and stability within containers of different sizes.

An additional object of the invention is to provide a flow control device which includes a simple and effective arrangement for adjustably positioning legs in at least two separate, positively located positions, with each position providing a leg span that is a major portion of the width of an associated container bottom wall so as to achieve maximum stability and ease of positioning the apparatus.

The foregoing and other advantages and objects of the invention are achieved in practice by providing a combination liquid drain, divider and deflector assembly including a drain tube having an upper end positionable adjacent the outlet of a sink or other source for recirculated liquids, a lower end portion immersed within a body of solvent, with a divider plate surrounding the opening adjacent the lower end of the downtube and extending generally radially outwardly a given distance, and a deflector unit positioned below and slightly spaced apart from said divider plate, with the deflector being imperforate and being positioned such that there is a circumferentially extending transfer passage defined between a lower surface of the divider plate and the outer margin of the deflector, whereby liquids flowing down the drain tube and through the outlet thereof are diverted horizontally and whereby the divider plate prevents turbulence created by return flow from being propagated upwardly of the divider plate. In use, the change of solvent flow direction from vertical to horizontal accelerates deposition of particulate matter within the liquid and enhances the separation of higher density particles from the body of the liquid.

The objects and advantages of the invention are also achieved by using the improved drain unit in association with a pump and motor disposed below the level of the liquid and above and radially inwardly of the outer margin of the divider plate.

The exact manner in which the foregoing and other objects and advantages of the invention are achieved in practice will become more clearly apparent when reference is made to the following detailed description of the preferred embodiments of the invention set forth by way of example and shown in the accompanying drawings, in which like reference numbers indicate the corresponding parts throughout.

BRIEF DESCRIPTION OF THE DRAWINGS

FIG. 9 is an enlarged fragmentary sectional view of the mechanism for adjustably positioning one of the legs supporting the flow control unit;

DESCRIPTION OF THE PREFERRED EMBODIMENTS OF THE INVENTION

While the principles of the invention may be applied to different forms of parts washers or other liquid flow devices, the detailed descriptions set forth below pertain to two somewhat different forms of parts washers, each having a reservoir in the form of a solvent barrel, a receptacle for the parts being washed in the form of a sink, and a submersible pump and motor for recirculating the solvent. The solvent is preferably a petroleum hydrocarbon solvent having a flashpoint of 105° F. or greater, but higher boiling solvents and aqueous liquids may also be used.

Figure 1:
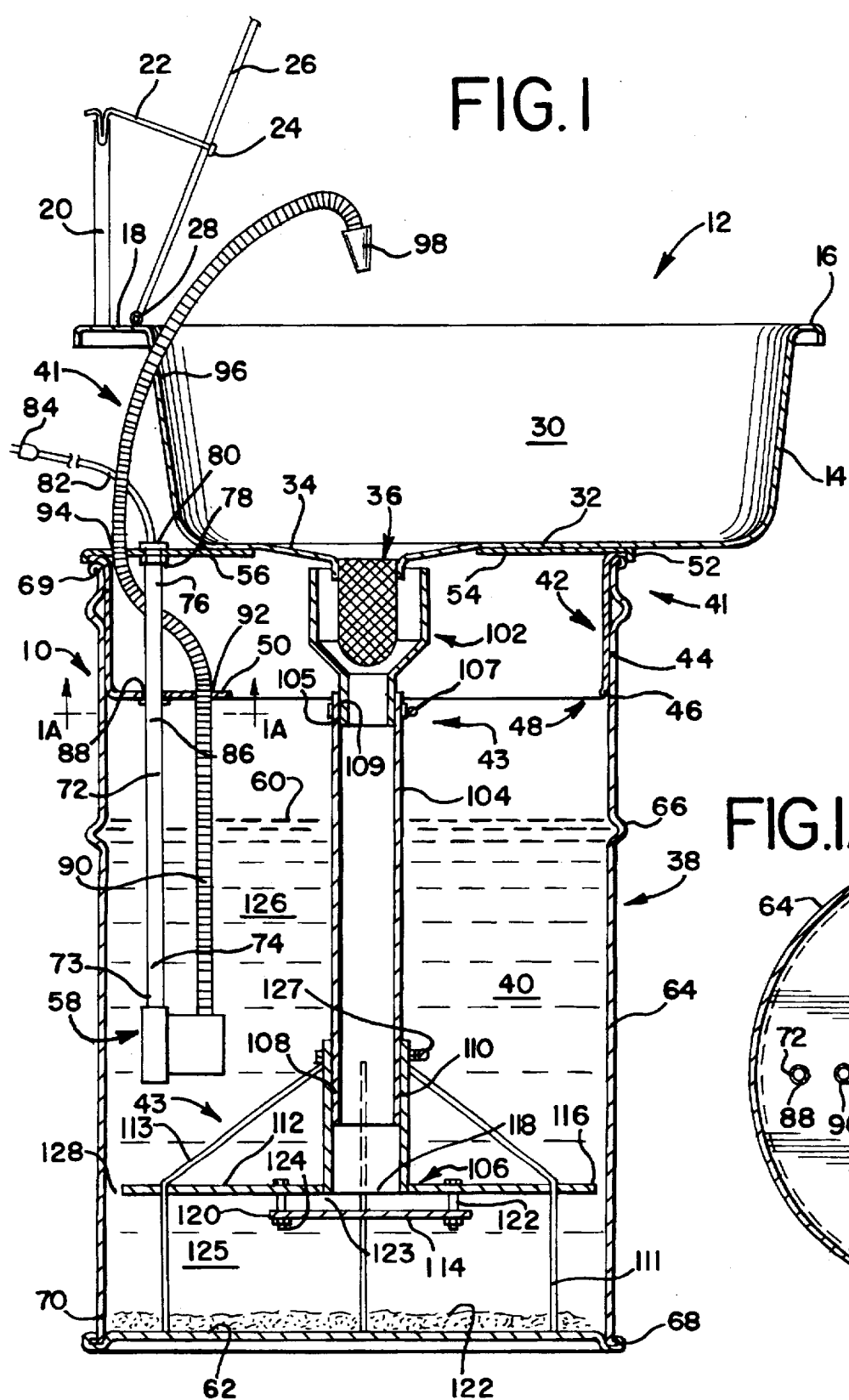
FIG. 1 is a vertical sectional view, with certain parts in elevation, of an improved parts washer made according to the invention.

Referring now to the drawings in greater detail, FIG. 1 shows a form of parts washer generally designated 10 and shown to include a receptacle in the form of a sink generally designated 12 for receiving mechanical parts or the like (not shown) to be washed by circulated solvent. The sink 12 includes plural, preferably tapered sidewalls 14, upper peripheral margins 16, and a rear margin 18 of increased width to which a stand 20 is affixed. The stand 20 positions a cover support 22 in the form of a rod with its free end terminating in a fusible link 24. The link 24 extends through an opening in a fire safety cover 26 which is mounted by a hinge 28 to the rear marginal flange 18 of the receptacle 12. The receptacle or sink 12 unit includes a generally opened interior area 30 defined in part by the sidewalls 14 and also by a bottom wall 32 that includes a tapered or beveled inner margin 34, the inner edges of which define a sink drain opening generally designated 36. A screen or filter "sock" 37 may be suspended from the marginal flange of the drain opening 36.

Figure 2:
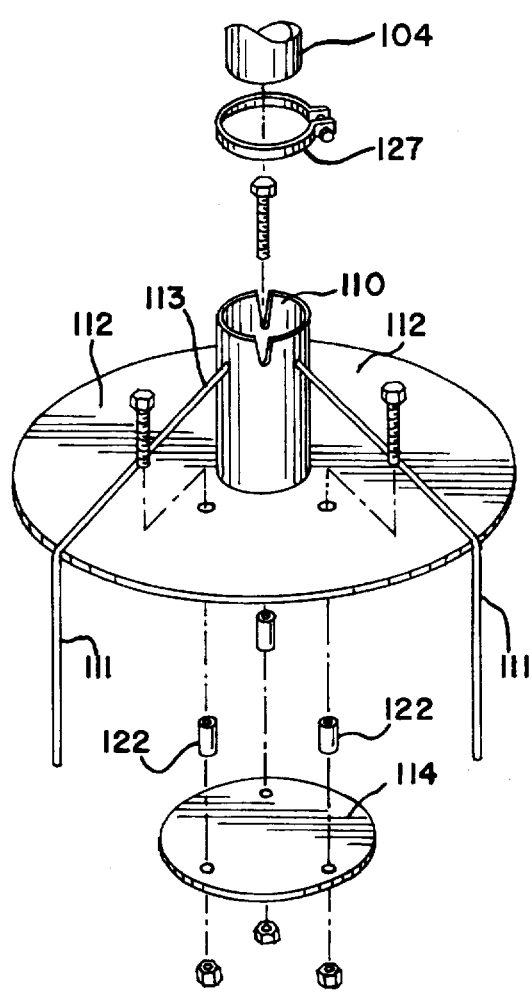
FIG. 2 is a fragmentary perspective view of the divider plate and flow deflector components of the invention, showing certain elements thereof in exploded relation.
Figure 3A:
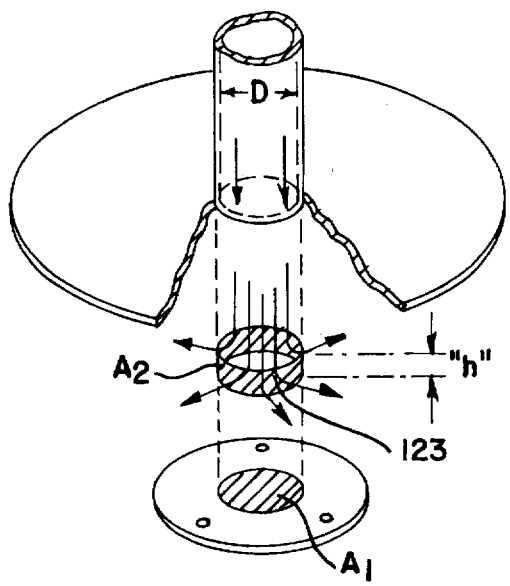
FIG. 3A is an exploded perspective view, with portions broken away, and partly diagrammatic in nature, showing the cross-sectional areas that should be considered for optimizing performance of the apparatus.
Figure 3B:
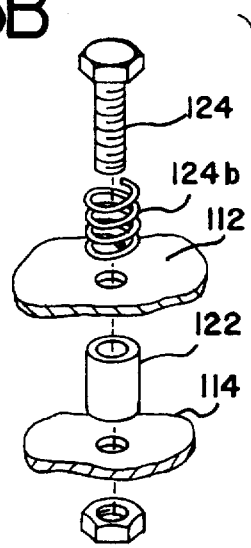
FIG. 3B is an exploded fragmentary perspective view of a portion of the apparatus used for movably positioning the deflector plate relative to the divider plate of the invention.
Figure 3:
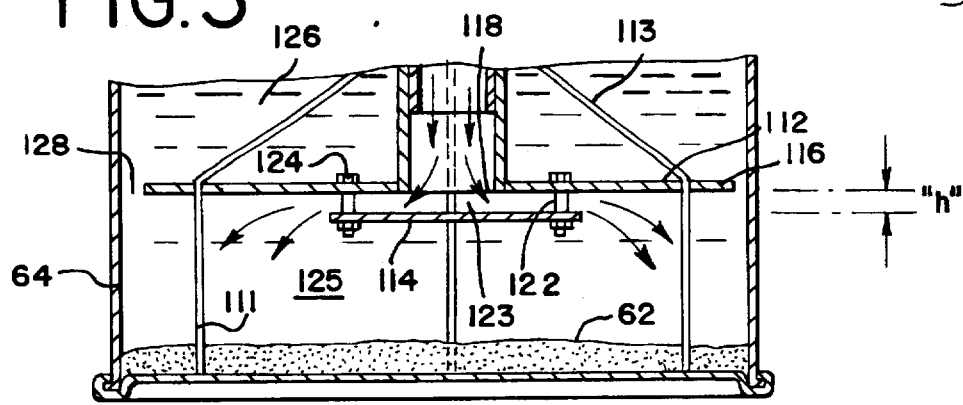
FIG. 3 is a fragmentary vertical sectional view of a portion of the parts washer unit of FIG. 1, showing the same in operation.

In the preferred form of apparatus shown in FIGS. 1-3, the entire parts washer is removable as two separate units from an associated barrel generally designated 38 and shown to act as the reservoir for a mass of cleaning solvent 40. The upper portion generally designated 41 includes all the elements necessary to wash parts, while the lower unit generally designated 43 comprises the drain and flow control assembly in the form of the solvent collector and the divider/deflector unit to be described herein.

Figure 1A:
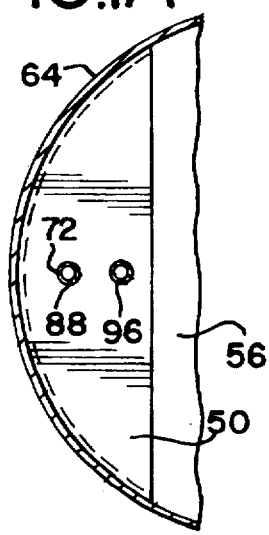
FIG. 1A is a fragmentary horizontal sectional view of a portion of the receptacle locating collar of FIG. 1, taken along lines 1A—1A of FIG. 1.

Therefore, the upper portion 41 of parts washer 10 further includes a mounting collar generally designated 42 having a cylindrical skirt 44 that includes lower margins 46 defining a generally circular central opening 48. A small panel 50 (see also FIG. 1A) extending chordwise between adjacent portions of the skirt 44 closes off a small portion of the central opening 48, for purposes described elsewhere herein. The mounting collar 42 terminates at its upper margin in a radially outwardly extending curl 52. Affixed to an upper surface portion of the curl 52 is a positioning plate 56, that presents an upper surface for secure attachment to the lower or facing surface of the sink bottom wall 32. A second plate 54 may optionally be provided for attachment to the sink bottom wall 32.

As shown in FIG. 1 and elsewhere, a pump and motor assembly generally designated 58 is positioned such that, when the parts washer 10 is in position of use, the pump and motor assembly 58 will lie somewhat beneath the upper surface 60 of the mass of solvent 40 but well above the bottom wall 62 of the drum or barrel 38. In this connection, it will be noted that the barrel 38 is of conventional construction, having cylindrical sidewalls 64 preferably containing at least one reinforcing rib 66, a bottom seam 68 at which the lower margin 70 of the sidewall 64 is joined to the outer margin of the bottom wall 62, and an upper seam 69 that supports the collar curl 52.

Referring again to the pump and motor 58, it will be noted that a rigid locating strut 72 in the form of a hollow tube or conduit is shown to be affixed at its lower end 74, as by threads 73 for example, to the pump and motor 58. The strut is located at its upper end 76 by a fastener 78 and a flange 80, which portions cooperate to trap the positioning plate 56 therebetween. As shown, the mounting strut 72 is preferably a hollow, tubular member adapted to receive an electrical cord 82 therein for energizing the pump and motor 58. Preferably, an electrical plug 84 is positioned at the free end of the cord 82, with an electrical switch (not shown) being provided for motor control purposes. The construction and operation of such controls are known to those skilled in the art. In the preferred construction, an intermediate portion 86 of the strut 72 extends through and is spaced by only a working clearance from an opening 88 in the chordwise panel 50. Accordingly, the strut is secured in two spaced apart places so as to be free of movement relative to the locating mounting collar 42 and the other elements of the parts washer 10.

Referring again to the pump and motor 58, a flexible conduit 90 for cleaning solvent is shown to extend from the pump outlet through a second opening 92 in the chordwise panel 50, through another opening 94 in the positioning plate 56 and upwardly through a slot 96 in the rear sink sidewall 14. The conduit 90 terminates in an outlet nozzle 98. The conduit 90 is preferably made at least in part from so-called flex tubing, permitting the tube to be positioned to suit the desires of the user. Such tubing has a self-sustaining character so that, once positioned as desired, it will not move without intentional effort.

Referring now to an important feature of the invention, the novel drain and flow control assembly generally designated 43 is provided. As shown in FIG. 1, in one preferred form of drain assembly, a collector generally designated 102 and shown to be in the form of an open-bottomed cup is provided. The drain assembly also includes a downtube 104, preferably cylindrical, having its upper margin 105 secured by an upper clamp 107 to the lower extension 109 of the collector 102. A divider/deflector assembly generally designated 106 is adjustably positioned adjacent the lower end 108 of the downtube 104. The principal elements of the divider/deflector assembly 106 include a mounting collar 110, a radially extending flat divider plate, 112, and a vertically spaced flow deflector plate 114.

In the form shown, the divider plate 112 comprises a flat disc having radially outer edges 116 spaced closely apart from the sidewall 64 of the barrel. A center passage in the form of an opening 118 in the divider plate lies inside the locating collar 110 to form a downflow passage for the solvent. The flow control or deflector plate 114 in this embodiment is a flat, imperforate disc spaced slightly apart from the divider plate 112, preferably using spacers 122 positioned by headed fasteners 124 and fastening nuts.

Referring now to FIGS. 3 and 3A, a concept which is important to the invention is illustrated. Here, between the divider plate 112 and the deflector plate 114 is an annular space with a vertical extent or height "h". The diameter of the downtube 104 is shown as "D", and the downtube cross-sectional area is shown as "$A_1$" in FIG. 3A. It will be understood that between the plates 112, 114 is a radially outwardly extending annular liquid transfer space 123 wherein solvent flowing down the tube changes direction from vertical to horizontal. The inner margin of this transfer space 123 is defined by a cylindrical projection of the inside diameter ("D") of the downtube onto the deflector plate 114, and the outer margin by an upward projection of the outer edge 120 of the disc 114. Thus, the annular transfer space is the volume radially outside the downtube ID projection and the outer edge of the plate 114. The inlet to this transfer space has an area equal to the product of the height ("h")

between the plates 112, 114 and the linear distance around the inner circumference of that space, i.e., the circumference of the downtube "D".

Accordingly, the downtube cross-sectional area $A_1$ is equal to $\pi r^2$ or $\pi(\frac{1}{2}D)^2$, where D is the diameter of the downtube. The cross-sectional area $A_2$ of the transfer passage inlet is $h \times \pi D$. Consequently, in order to avoid acceleration of the flow rate as the fluid changes direction, the cross-sectional area $A_2$ of the passage inlet (FIG. 3A) should be equal to or greater than that of the downtube cross-sectional area $A_1$.

Inasmuch as the inside diameter of the tube 104 is known, it is easy to determine a minimum height or space between the plates 112, 114. For example, if the downtube diameter is 2 inches, its cross-section will be 3.14 square inches ($\pi r^2$ equals $A_1$). The transfer area inlet passage for such apparatus has a length or circumference equal to 6.28 inches ($\pi D$). Therefore, in order to have cross-section of no less than 3.14 square inches, h, the other term in the expression $A_2=h\pi D$, must be at least 0.5 inches.

In practice, it has been determined that $A_2$ should be equal to or somewhat larger than $A_1$, but not greatly so.

As used herein, and in the claims, therefore, the expression "transfer passage inlet" or words of like import should be taken to mean that area between the two plates 112, 114 lying tangent to a downward projection of the inside diameter of the downtube, i.e., the area illustrated as $A_2$ in FIG. 3A.

A circumferential transfer passage inlet 123 is thus formed between plates 112, 114, the cross sectional area of which inlet 123 is equal to or larger than the cross sectional area of the center passage 118.

In the form shown, a cylindrical clamp 127 surrounds the upper margin of the locating collar 110 and pinches the same into snug, immovable contact relative to the drain downtube 104. Adhesives or other fastening mechanisms will function equally well.

The divider/deflector assembly 43 is preferably free-standing, supported in a spaced apart position from the drum bottom wall 62 by legs 111 extending downwardly from the divider plate 112 and leg braces 113 extending between the plate 112 and the upper margin of the locating collar 110.

Referring now to the operation of the form of apparatus shown in FIG. 1, it will be assumed that the drum or barrel 38 has been filled with a mass of cleaning solvent 40, and that the assembly 43 is dispersed within the barrel 38 and that the parts washer assembly 41 is positioned over the barrel 38 as shown. When it is desired to use the unit, the operator manipulates a switch (not shown) energizing the pump and motor assembly 58 to which current is supplied by the plug and cord 84, 82. As the motor operates the pump, solvent is pushed up from the barrel or drum reservoir 38 and pumped through the flexible conduit 90 to the discharge nozzle 98. Thereafter, under control of an operator, the liquid washes the parts and there passes into the lower portion of the sink or like receptacle 12, and thence through the sink drain opening 36 through the filter/strainer sock 37, and into collector 102. As the solvent thus flows from there downwardly through the cylindrical downtube 104, it passes through the center opening or passage 118, where the direction of flow changes from vertical to horizontal as the slowly moving liquid stream encounters the flow deflector 114.

Referring now to FIG. 3, for example, it is shown that the liquid then passes radially between the opposed surfaces of the flow deflector 114 and the divider plate 112. This flow rate is lower than that existing in the vertical downtube 104, inasmuch as the cross sectional area of the transfer passage inlet is significantly larger than that of the outlet passage 118 in the downtube 104. These velocity gradients and direction changes combine to permit finely subdivided but stream-entrained particles to separate from the liquid and fall on to the upper surface of the drum bottom wall 62, forming a blanket 122 overlying the upper surface of the drum bottom wall 62. If the velocity is too low, particulate accumulation may occur directly below the downtube, with the radial flow rate being too slow to move the particulates off the outer edge of the deflector plate; if the velocity is too high, there will be turbulence in the transfer space and possibly in the entire lower region.

According to the invention, a contaminant-rich but generally quiescent region 125 is formed beneath the divider plate 112, with the plate 112 serving to inhibit propagation of any turbulence which might be occasioned by return flow beneath the divider 112. Whatever turbulence may be created by flow in the downtube 104 is buffered and eventually eliminated by the provision of the deflector 114 which also accelerates particle separation.

The solvent flow that does occur between the contaminant-rich region 125 and the clarified region 126 above the plate 112 results from gradual vertical flow through the annular passage or space 128 lying between the outer edge 116 of the plate 112 and the inner surface of the drum sidewall 64. Accordingly, with the pump and motor assembly 58 being disposed in this upper quiescent and clarified solvent region 126, solvent picked up and circulated through the conduit 90 and from the discharge nozzle 98 into the sink interior will be significantly cleaner, on the average, than the solvent in the contaminant-rich zone or space 125.

In FIG. 3, the directional arrows show the manner in which the contaminant separation and return flow of clarified solvent take place. Accordingly, in keeping with the invention, the pump and motor 58 are positioned in an isolated supernatant region 126. Specifically, the pump lies significantly below the top surface of the solvent mass 40 and yet is positioned above the upper surface of the divider plate 112. Preferably, the pump and motor 58 lie radially inwardly of the outer plate edge 116 so that liquid is in a region that is also free from return flow through the peripheral passage 128.

In keeping with the invention, this arrangement of the divider plate and deflector unit provides greatly increased contaminant separation and maximizes recirculation of clarified solvent only. If settling aids are used as an additive to the solvent, the advantageous effect can be further increased.

In those versions of the inventive apparatus where the clamp 127 or the like permits the entire divider/deflector assembly to move up and down as a unit, adjustments can be made for optimum placement of the divider plate. These adjustments may take into account differences in the overall liquid level and may also serve to aid the positions of the pump and motor relative to the divider plate.

If desired, the interior of the drum may be protected against direct contact with the cleaning solvent or aqueous liquid by inserting a plastic bag or the like inside the drum or barrel 38.

Figure 4:
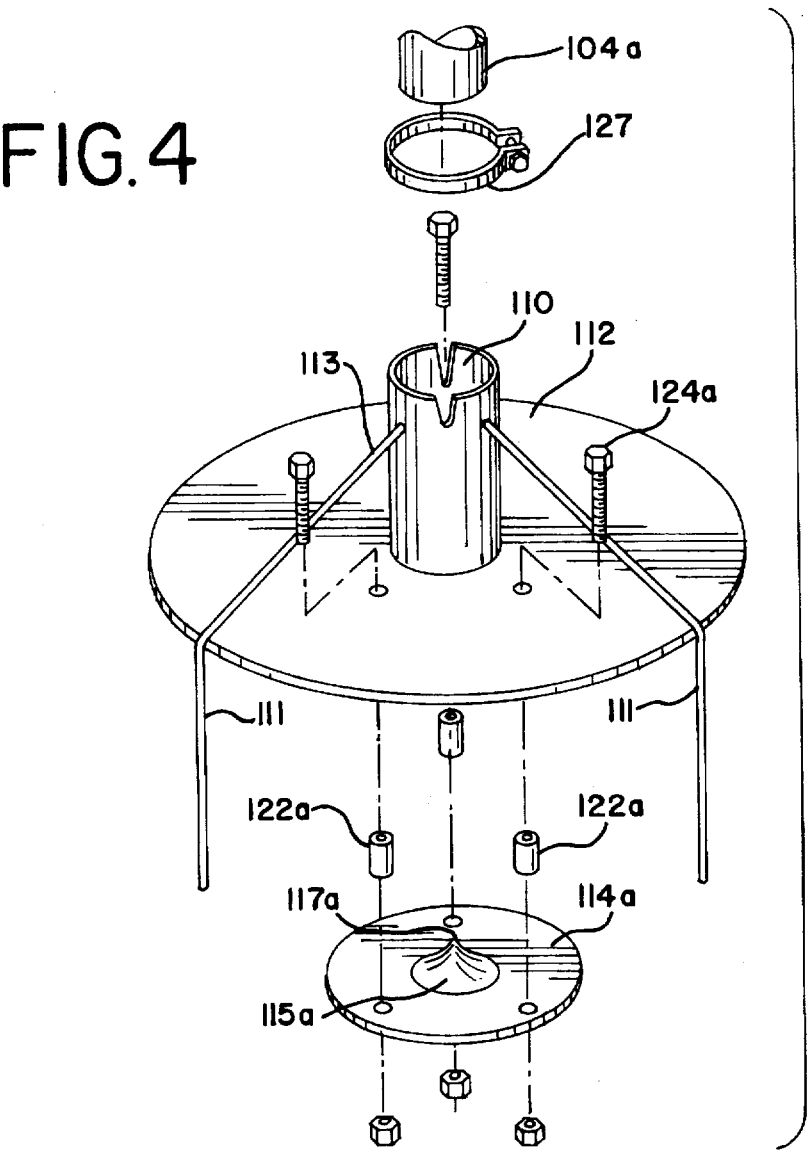
FIG. 4 is a perspective view similar to that of FIG. 2, showing a modified form of deflector plate.
Figure 5:
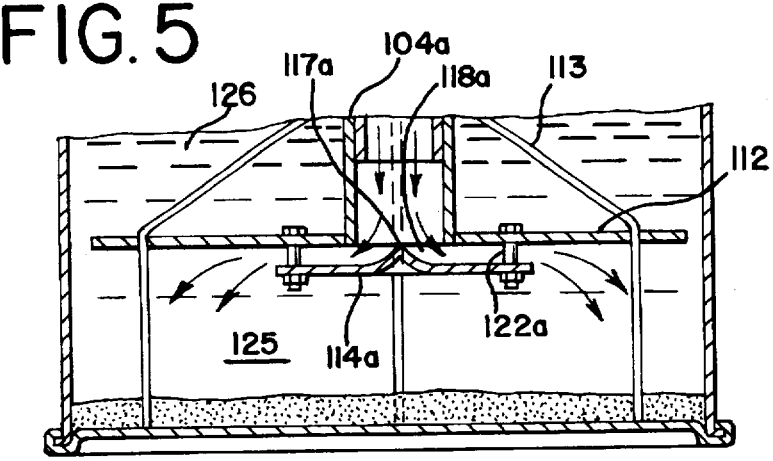
FIG. 5 is a fragmentary vertical sectional view of the form of divider plate and deflector unit shown in FIG. 4.

In the version shown in FIGS. 4 and 5, the form of the flow deflector plate 114a is different from its counterpart 114. Thus, in the version of FIGS. 4 and 5, a contoured center section 115a is provided for the plate 114. The raised center section 115a includes a peak 117a which extends to or near the center passage 118a in the lower end of the downtube 104a. The spacers 122a and fasteners 124a, etc. are the same as their counterparts in FIGS. 1–3.

The operation of the unit shown in FIGS. 4 and 5 is substantially the same except that the peaked and contoured center section 115a in effect creates a center passage 118 which induces less turbulence as the liquid flow changes from vertical to horizontal. The height of the peak 117a and its exact position are selected in such a way as to ensure smooth transitional flow in this region. With sufficiently high flow volumes, when the embodiment shown in FIGS. 1–3 is utilized, there is a possibility of turbulence on the deflector plate 114 directly beneath the center passage 120. The embodiment of FIGS. 4 and 5 can reduce or eliminate this condition.

Figure 6:
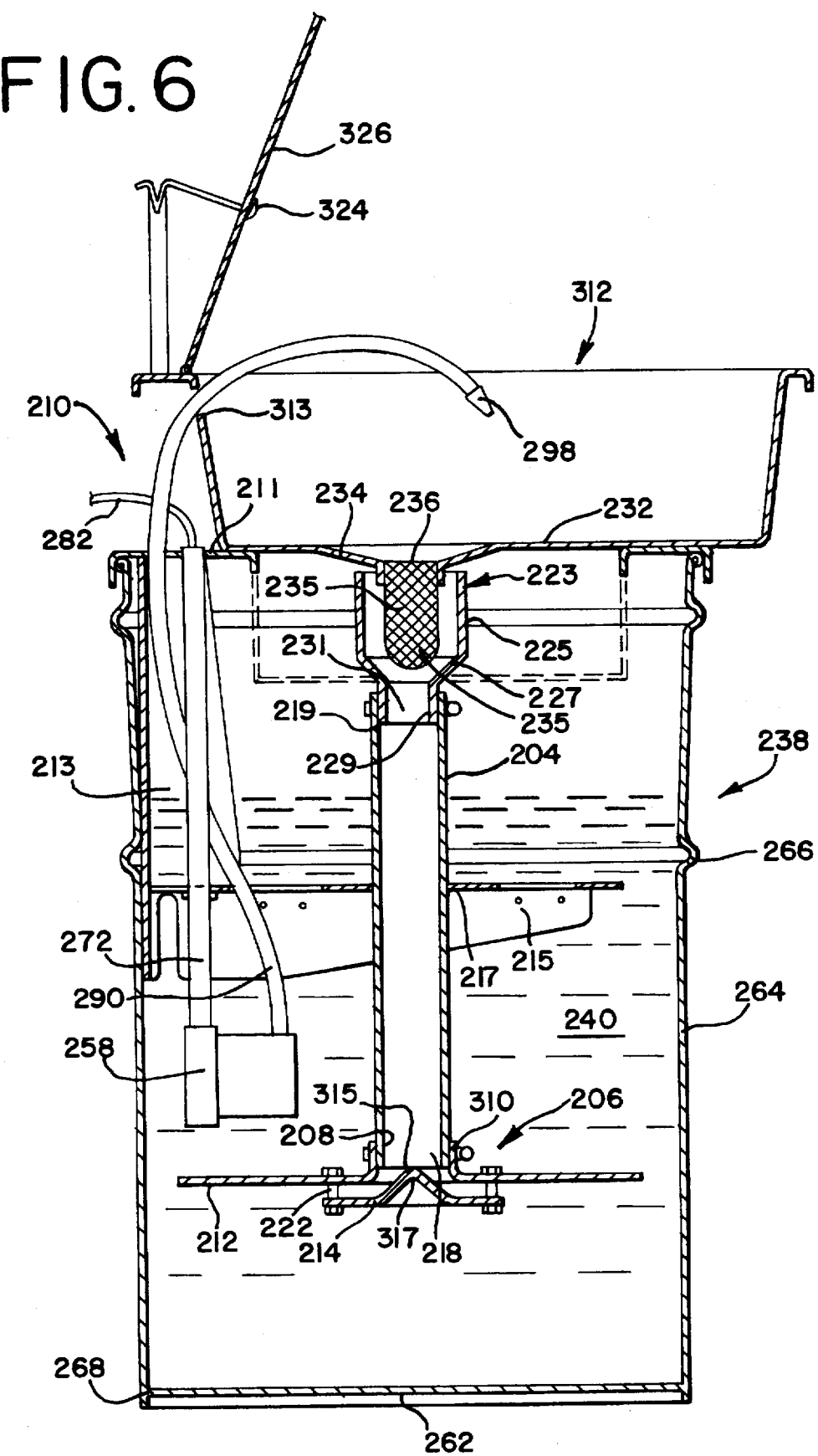
FIG. 6 is a vertical sectional view of a modified parts washer unit made according to the invention.
Figure 7:
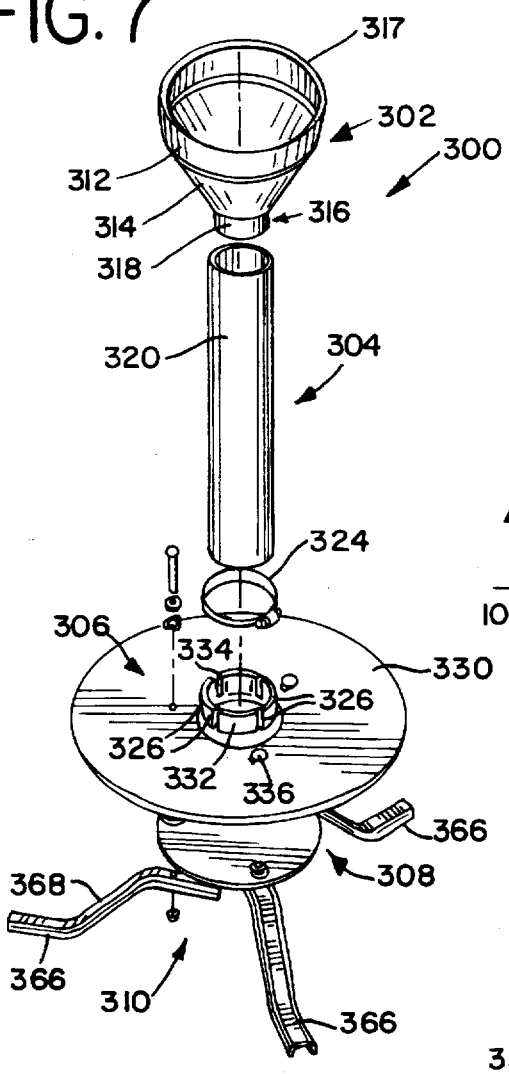
FIG. 7 is an exploded perspective view of a flow control device made according to the invention and showing the adjustable legs in one position thereof.
Figure 8:
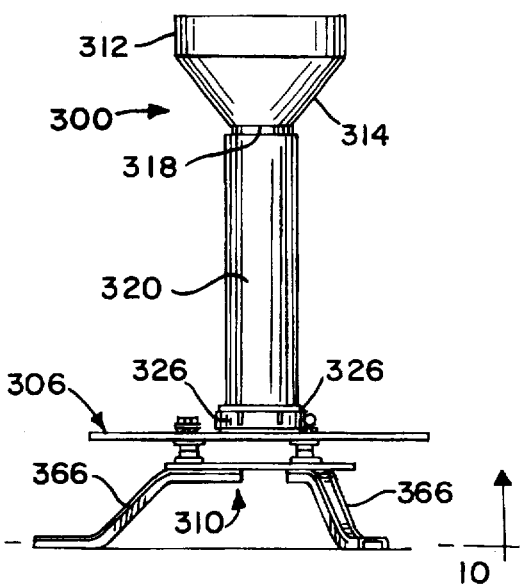
FIG. 8 is a side elevational view of the apparatus of FIG. 7, showing the legs in a given position of adjustment.

Referring now to FIG. 6, a further modified form of parts washer apparatus generally designated 210 is shown to be provided. Here, a reservoir in the form of a barrel 238 is also shown to accommodate a mass of cleaning solvent 240. The drum or barrel 238 includes a bottom wall portion 262, a generally cylindrical sidewall 264 with stiffening or reinforcing ribs 266, and a seam 268 at which the bottom wall 262 is secured to the sidewalls 264.

In this form of apparatus, certain of the functional parts are constructed and arranged in a different way than their counterparts in FIGS. 1–5. Thus, the apparatus 210 of FIG. 6 includes a rear barrel partial cover plate 211, a downwardly extending vertical positioner frame 213 having secured to the bottom thereof a transverse brace 215. The transverse brace 215 includes a center opening 217 which accommodates the center sidewall portion of a cylindrical downtube 204. In this embodiment, therefore, the downtube and divider/deflector assembly hangs from the brace 215 instead of resting on legs on the bottom wall of the reservoir.

A divider/deflector assembly generally designated 206 is positioned at the lower end 208 of the downtube 204. A flat divider plate 212 of generally circular form is secured by a mounting collar 310 to the lower end 208 of the downtube 204, and a contoured flow deflector plate 214 is positioned beneath and spaced apart from the divider plate 212. As in the other embodiment, a center opening 218 is provided in the divider plate 212 for communication with fluid passing through the downtube 204. Spacers 222 are provided for adjusting the position of the flow deflector 214 relative to the plate 212 if desired.

As in the embodiment shown in FIGS. 4 and 5, the deflector plate 214 includes a contoured center section 315 having a raised or peaked point or like portion 317 adapted to approach or enter the center opening 218. As in the embodiment of FIG. 4 and 5, this provides a more gradual transition, from vertical to horizontal movement on the part of the solvent, and this in turn causes a reduction in turbulent flow.

Referring now to other elements of this construction, a pump and motor unit 258 is shown to be positioned by a tube or like rigid locating strut 272 extending downwardly from or through an upper section of the transverse brace 215 and also through the partial rear cover plate 211. This rigidly mounts the pump and motor 258. Because the strut 272 is hollow, a power cord 282 may extend therethrough. A conduit generally designated 290 and preferably made of flex tubing extends from the outlet of the pump 258, through the brace 215, the cover plate 211 and into the sink 312 through a rear wall opening 313. The conduit 290 terminates in an outlet nozzle 298 lying within the sink 312 in use. The sink bottom wall 232 includes a tapered section 234 and a center opening 236, closed off by a filter bag 235 or screen unit.

Another aspect of the embodiment shown in FIG. 6 is that, affixed to the upper portion 219 of the downtube 204 is an enlarged collector generally designated 223 and shown to include a somewhat cylindrical upper margin 225, a tapered or conical sidewall 227 and a reduced diameter, generally cylindrical outlet opening 229 that registers with the opening 231 in the upper margin 219 of the downtube 204.

The unit 210 operates in substantially the same manner as its earlier described counterparts, particularly in that the pump and motor unit 258 is positioned in the quiescent zone above the divider plate 212 and radially inwardly from the sidewalls 264 of the barrel or drum 238. The provision of the enlarged collector 223 is to insure that there is registration between the outlet of the sink 312 and the downtube 204. The provision of other elements, such as the fire safety cover 326, secured by a fusible link 324 are substantially the same as those in the earlier counterpart model described in detail. U.S. Pat. No. 3,522,814 also discloses such a structure.

In the illustrations given, the outer margins of the divider plate are shown to be spaced relatively closely apart from the sidewalls of the reservoir receiving the solvent. However, such proximity is not necessary to the practice of the invention. Thus, if a reservoir is used that is very large relative to the size of the divider plate, then there is no need to space the outer margins or edges of the divider plate adjacent a wall of the reservoir. The only requirement is that relative to the flow to be controlled, the divider plate extend radially outwardly of the downtube a distance sufficient to extend beyond the region of disturbance caused by return solvent flow.

Ordinarily, the deflector plate is of reduced diameter relative to the divider, and the divider plate may have an absolute size of 10 to 18 inches in diameter for moderate heights and diameters of the downtube, such as one to three feet in height and two to three inches in diameter. With larger heights causing more turbulence when the solvent or other liquid is returned to the body of the solvent, a deflector plate of a greater extent than 6 to 9 inches may be required, and vice versa. Likewise, the size of the deflector plate must be sufficient to ensure that the liquid flow is substantially horizontal and that the velocity adjacent the outer margin of such plate is low enough that sedimentation will occur and turbulence will be minimized. At any rate, all components are sized such that laminar flow tends to occur through the drain downtube and separation components.

The deflector is preferably spaced from the divider plate a distance such that the total cross-sectional area of the circumferential transfer passage is equal or greater than that of the downtube adjacent the point where the tube meets the divider plate.

In using a 30 gallon drum, it has been found advantageous to provide a two inch diameter downtube, fitted with a circular divider plate of a 15 inch diameter, with a 6 inch diameter deflector plate being spaced 0.5 to 0.75 inches below the divider. However, the divider plate need not be circular and in many cases, need be no larger than just described, even if the reservoir may have a diameter of several feet or even much more.

As noted, if the deflector plate is spaced very close to the divider, the deflector plate will normally be of larger diameter than it would be if it were spaced somewhat farther apart vertically.

The drawings have illustrated a contoured deflector plate with a raised center section. Such a deflector plate can be provided with radial grooves or ribs and may have a center section which extends into the drain tube outlet opening to a point above the level of the divider plate if this is desired to create a more gradual flow in the transition area. The diameter of the deflector plate must be significantly larger than the diameter of the downtube opening, usually at least twice the diameter of such opening.

As pointed out, the distance between the bottom or particulate matter-accumulating surface of the reservoir and the divider plate depends on the various factors, including the viscosity of the liquid, the degree of contamination and the total depth of liquid available.

In the described embodiments, the drain assembly may be separately constructed and used with an existing parts washer or the principles of the inventions may be embodied in a unitary device wherein the drain assembly is integral with the sink and/or with other elements of the parts washer. While parts washers are the presently anticipated environment for the apparatus of the invention, in other applications wherein it is desired to separate particulate sedimentary matter from a liquid, the principles of the invention may be applied with equal success.

Referring now to FIGS. 7–11, a somewhat modified flow control assembly generally designated 300 and embodying the invention is shown. Here, the assembly 300 is shown to include a number of principal sub-assemblies, including a collector unit generally designated 302, a drain downtube generally designated 304, a divider plate generally designated 306, a deflector plate generally designated 308 and an assembly 310 for adjustably positioning the span of the legs of the unit as may be indicated by the width of the associated solvent drum.

Referring again to FIGS. 7 and 8, it is shown that the collector unit 302 may include an upper cylindrical margin 312, a frusto-conical or tapered wall section 314 and a lower insert section generally designated 316 and shown to have a cylindrical sidewall surface 318 providing a drain outlet opening 319 therein. The inlet opening generally designated 317 is preferably of significantly larger size than the drain tube so as to render easier collection of liquid from the associated sink, considering that the solvent drain downtube should be of relatively small diameter.

The downtube 304 includes a cylindrical body 320 of just larger diameter than the outer diameter of the sidewall 318 of the cylindrical insert 316. An inlet 322 is provided at the top of the downtube and an outlet 324 is formed at the bottom of the tube.

The divider plate 306 is shown to include a flat plate body 330 and to have a short upstanding cylindrical collar 332 providing an inlet opening 334 for materials flowing down through the downtube 304. The collar 332 includes one or more axial slots 326 to insure that it may be snugly secured over the lower margin of the downtube 320 when the screw clamp 328 is placed over the outer surface of the downtube and tightened in a known manner. Openings 336 are provided in the plate body 330 to receive fastener assemblies generally designated 338, one of which is best shown in FIG. 9.

Referring now in particular to FIG. 9, it is shown that the fastener assembly also serves as a means of securing a divider plate 306 and the deflector plate 308 in spaced apart relation. For this purpose, the lower surface of the divider plate includes a contoured spacer half 340 while a substantially identical but oppositely directed spacer half 342 is formed integrally with and extends upwardly from the top surface of the deflector plate 308.

The fastener assembly 338 includes a threaded shank portion 344, a nut 346, a head 348, a washer 350 and a plurality of wave springs 352 biasing the fastener head away from the nut 344. A horizontal flange 354 of one of the legs generally designated 356 is shown to be secured in this manner, i.e., to be pinched between the nut 346 and the lower surface of the deflector plate 308. The outer end 358 of the leg flange 354 includes a rounded boss or dimple 360 or the like which is adapted to be received within a pocket 362 formed in the deflector plate 308. With this arrangement, which is identically constructed for the three or more legs provided to position the flow control unit, adjusting the faster assembly will permit a desired amount of compressive load to be applied to urge the leg flange 354 against the bottom surface of the deflector plate. In order for the leg to be rotated, the boss 360 must be dislodged from the pocket 362 by compressing the array of wave springs biasing the fastener head away from the nut.

This is easily done when desired by grasping the outer edge or foot portion 366 or offset portion 368 of the leg and rotating it about the pivot point formed by the fastener until the leg is positioned such that the boss 360 is received within an adjacent pocket 362a which is positioned such that the legs assume a generally chordwise orientation (FIG. 11) rather than the radial orientation (FIG. 10) with which the maximum width or span of the feet is achieved. The engagement of the boss 360 and the pocket 362 or 362a insures that there will be no unintentional leg movement.

Figure 10:
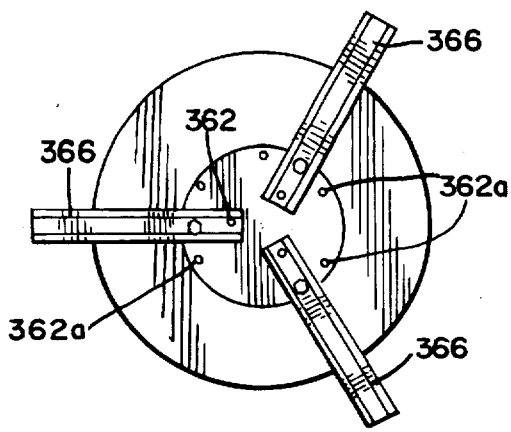
FIG. 10 is a bottom plan view, taken along lines 10—10 of FIG. 8 and showing the flow control unit legs in an extended position.
Figure 11:
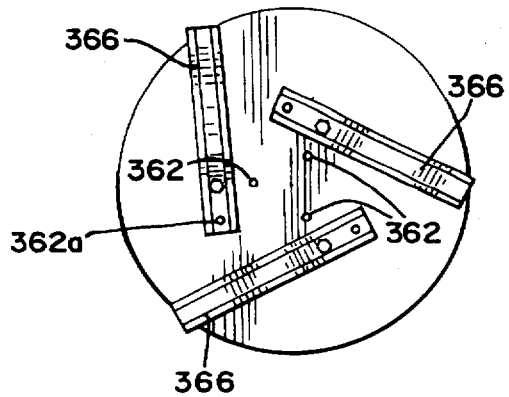
FIG. 11 is a view similar to that of FIG. 10 but showing the legs in a retracted position wherein the legs are angularly related, and of reduced overall span, relative to their fully extended positions shown in FIG. 10.

Preferably, as shown in FIGS. 10 and 11, there are six to nine individual pockets, 362, 362a, etc., although any reasonable number might be provided, with each separate pocket providing a different position of adjustment leg for the leg in question.

In other respects, the flow control unit is similar to its counterpart shown in FIGS. 1–6.

In some cases, it may be desired, as for purposes of clearing settled particles from the transfer area between the divider and the deflector plates 112, 114 (in FIGS. 1–3 for example) to move the plates 112, 114 vertically with respect to each other. To permit such an agitating movement, the lower plate may be resiliently mounted relative to the upper plate, and a rod or the like may be inserted through the downtube and positioned with its lower end in contact with the deflector plate 114. Thereupon, the rod may be manipulated so as to move the deflector plate downwardly one or more times against a resilient force. FIG. 3A shows that, to provide the movement potential necessary for such agitation, compression springs 124b may be positioned between the upper surface of the divider plate 112 and the lower surfaces of the heads of the fasteners 124. In such a construction, the plate 114 is normally positioned beneath the plate 112 a distance equal to the height "h" which is also equal to the length of the spacer 122. Moving the deflector plate 114 downwardly compresses the springs 124b as free play is taken up; when the downward force is released, the plate 114 springs upwardly and resumes its initial position spaced apart from the plate 112 a distance equal to the length of the spacer 122. The total amount of lower plate movement or travel is determined by the construction and arrangement of the springs. Typically, they might allow from one-half inch up to two or more inches of movement. In this embodiment, the legs (if any), whether of the form shown in FIGS. 1–5 or such as those shown in FIGS. 7–11, should be mounted on the divider plate 112 in FIGS. 1–3B or the divider plate 306 in FIGS. 7–8.

While the invention is not intended to rely on any particular mode of operation for its success and not to be considered limited to any particular theory of operation, it is believed possible that the simple combination of changing fluid flow direction and permitting the flowing fluid to decelerate in velocity combine to strip or precipitate or otherwise separate marginally soluble or finely dispersed sedimentary materials from the mass of the solvent. This is done by causing these materials to impinge on a deflector unit that changes vertical flow to radial flow, whereby the accumulated particulates separating adjacent the outer margin of the deflector will be pushed from the edge of the plate at low speed and lie in a quiescent region from which they are permitted to settle on the bottom wall of the reservoir.

It will thus be seen that the present invention provides a parts washer with solvent flow control, having a number of advantages and characteristics including those expressly pointed out here, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

We claim:

1. A parts washer for washing mechanical parts, said parts washer comprising, in combination, a parts receiving receptacle positionable atop a reservoir for cleaning liquid, a drain opening formed in a part of said receptacle, a receptacle positioner affixed to a portion of said receptacle and engageable with a portion of the reservoir so as to locate said receptacle with respect to said reservoir, a drain flow control assembly, said drain flow control assembly including a drain downtube having inlet and outlet openings at its respective ends, said downtube inlet being positioned in use adjacent said receptacle drain opening, said drain flow control assembly further including a substantially flat imperforate divider plate surrounding said drain tube outlet and extending radially outwardly from said center opening a distance at least equal to twice the diameter of said outlet opening, and, positioned above said divider plate, a pump and motor assembly secured to a portion of said receptacle positioner, and including a liquid inlet lying radially inside the radially outer edge of said divider plate, a liquid outlet and a liquid conduit extending from said outlet and into an interior portion of said receptacle and terminating in an outlet nozzle assembly, said drain flow control assembly further including an imperforate deflector plate positioned beneath, substantially parallel to and closely spaced apart from said divider plate, at least one of said divider plate and said deflector plate including plural, pivotally mounted legs extending downwardly from one of said divider plate and said deflector plate to support said drain flow control assembly with respect to said reservoir, said deflector plate having its radially outer edge spaced radially inwardly of said radially outer edge of said divider plate, with said space between corresponding parts of said divider and deflector plates defining a radially extending transfer space with circumferential inlet and outlet passages, whereby, in use, solvent flows through said conduit and into said receptacle vertically downwardly through said downtube, and thereafter radially outwardly through said transfer space, said divider plate serving to divide the subsurface region of said liquid into a lower region wherein particulates in said liquid flow radially over said deflector plate and accumulate in said lower region by sedimentation, and a quiescent upper region containing clarified solvent and lying above said divider plate, said upper region containing a greatly reduced concentration of entrained particulate matter in relation to said lower region.

2. A parts washer as defined in claim 1, wherein said plural pivotally mounted legs are positioned by said deflector plate, said legs and said deflector plate having cooperating formations thereon for engagement between portions of said leg and portions of said plate to permit each of said legs to achieve at least two stable positions.

3. A parts washer as defined in claim 1, wherein each of said plural pivotally mounted legs includes a lower foot portion, an intermediate portion and an upper flange portion, said upper flange portion having an end with a detent portion thereon and an opening therein in said upper portion for receiving a spring biased fastener, said leg being secured to said deflector plate and said deflector plate including at least two cooperating detents for each leg, thereby permitting at least two stable positions of adjustment for each of said legs.

4. A drain flow control assembly for liquids received within a reservoir and having a given liquid level, said flow control assembly comprising, in combination, a drain downtube having inlet and outlet openings and being positionable with its inlet opening above the level of said liquid and its outlet position below said liquid level, a divider plate surrounding said outlet opening and extending radially outwardly of said center opening a distance equal to at least twice the diameter of said downtube opening, an imperforate deflector plate positioned beneath and spaced parallel to and closely apart from said divider plate, so as to form a radially extending transfer space between said plates, said deflector plate having a reduced radial extent relative to that of said divider plate, at least one of said divider and deflector plates including adjustably positionable supporting legs extending downwardly therefrom, whereby when said assembly is positioned in a liquid-containing reservoir with said downtube outlet below the upper surface of the liquid, said liquid flowing through said downtube passes vertically through said downtube outlet opening and then horizontally through said transfer space between adjacent portions of said divider and deflector plates, said flow through said space serving to separate entrained particulate matter disposed in said liquid, and said divider plate serving to separate a lower settling region and an upper region of quiescent, clarified liquid within said reservoir.

5. A drain flow control assembly as defined in claim 4, wherein said adjustably positionable supporting legs are pivotally attached to said deflector plate, and in which each of said legs includes an upper portion having an opening therein for receiving a resiliently biased fastener, and a spaced apart portion with a detent thereon, and wherein said deflector plate includes at least two cooperating detents on said plate for each of said legs, said leg being movable against the resistance of said resilient fastener between positions of adjustment wherein said detents on said leg and said plate are in registry with each other.

6. A drain flow control assembly as defined in claim 5, wherein said resiliently biased fastener includes at least one wave spring supplying said resilient bias.

7. An apparatus as defined in claim 4, wherein said legs include foot portions, said legs being sized, constructed, and arranged so that said foot portions are in approximate vertical alignment with the outside edge of said divider plate in one position and extend substantially radially outwardly of said divider plate outside edge in another position.

8. In a parts washer including a sink positionable over a container forming a cleaning liquid reservoir and including a positioner for registering the receptacle or sink relative to said container, a drain opening in said sink, and a pump and motor secured to at least one portion of one of said receptacle and said positioner, said pump including a liquid inlet and liquid outlet and a liquid conduit extending between said liquid outlet and an interior portion of said sink, whereby cleaning liquid is picked up by said pump and motor and circulated through said conduit to the interior of said sink, through said drain opening and into said container, the improvement comprising a drain flow assembly comprising, in combination, a drain downtube having inlet and outlet openings and being positionable with its inlet opening above the level of said liquid and its outlet position below said liquid level, a divider plate surrounding said outlet opening and extending radially outwardly of said center opening a distance equal to at least twice the diameter of said downtube opening, an imperforate deflector plate positioned beneath and spaced parallel to and closely apart from said divider plate, so as to form a radially extending transfer space between said plates, said deflector plate having a reduced radial extent relative to that of said divider plate, said parts washer further including plural support legs for said drain flow assembly, said support legs being movable between positions of adjustment to provide legs with different circumferential spans between their radially outermost portions in different positions of adjustment, whereby liquid flowing through said downtube passes vertically through said downtube outlet opening and then horizontally into and through said transfer space between adjacent portions of said divider and deflector plates, said flow through said passage serving to separate entrained particulate matter disposed in said liquid, and said divider plate serving to separate a lower settling region from an upper region of quiescent, clarified liquid within said reservoir, said parts washer further including plural support legs for said drain flow assembly, said support legs being movable between positions of adjustment to provide legs with different circumferential spans between their radially outermost portions in different positions of adjustment.

* * * * *